(12) United States Patent
Gerez et al.

(10) Patent No.: US 7,530,372 B2
(45) Date of Patent: May 12, 2009

(54) FLEXIBLE NON-BONDED PIPE WHICH IS USED TO PRODUCE A DYNAMIC PRESSURISED FLUID TRANSFER HOSE AND, IN PARTICULAR, A MUD HOSE FOR ROTARY OIL DRILLING

(75) Inventors: Jean-Michel Gerez, Paris (FR); Pascal Estrier, Saint-Wandrille-Rançon (FR); Cédric Monteiro, Anglet (FR)

(73) Assignee: Technip France (FR)

( * ) Notice: Subject to any disclaimer, the term of this patent is extended or adjusted under 35 U.S.C. 154(b) by 4 days.

(21) Appl. No.: 10/564,379

(22) PCT Filed: Jul. 8, 2004

(86) PCT No.: PCT/FR2004/001807

§ 371 (c)(1),
(2), (4) Date: Mar. 15, 2006

(87) PCT Pub. No.: WO2005/008117

PCT Pub. Date: Jan. 27, 2005

(65) Prior Publication Data

US 2006/0191587 A1    Aug. 31, 2006

(30) Foreign Application Priority Data

Jul. 15, 2003    (FR) .................................. 03 08614

(51) Int. Cl.
*F16L 11/00*    (2006.01)
(52) U.S. Cl. ..................... 138/134; 138/127; 138/133; 138/144; 138/138
(58) Field of Classification Search ................ 138/125, 138/129, 130, 132, 133, 134, 135, 137, 138, 138/144, 153, 140, 141, DIG. 1; 428/36.91
See application file for complete search history.

(56) References Cited

U.S. PATENT DOCUMENTS 693,281 A    2/1902    Langdon ..................... 110/145

(Continued)

FOREIGN PATENT DOCUMENTS

FR    2664019    1/1992

(Continued)

OTHER PUBLICATIONS

International Search Report PCT/FR2004/001807 dated Dec. 6, 2004.

*Primary Examiner*—Patrick F Brinson
(74) *Attorney, Agent, or Firm*—Ostrolenk, Faber, Gerb & Soffen, LLP

(57) ABSTRACT

The invention relates to a non-bonded pipe which is used to produce a dynamic pressurized fluid transfer hose and, in particular, a mud hose for rotary oil drilling. The inventive pipe consists of the following elements from inside outwards: an inner polymer sheath, at least two crosswise-arranged reinforcing plies comprising a wire which is wound helically at opposing winding angles, A and B, which are close to the angle of equilibrium of 55°, having an average that is centered on a value close to the equilibrium angle value; and an outer polymer sheath. The pipe also comprises an anticreep layer which is made from at least one coil with contiguous edges of a strip with high mechanical properties. Moreover, the aforementioned winding angles, A and B, of the crosswise-arranged reinforcing plies are not equal.

16 Claims, 3 Drawing Sheets

U.S. PATENT DOCUMENTS

| | | | |
|---|---|---|---|
| 1,852,632 A | 4/1932 | Wagner et al. | 285/81 |
| 1,963,368 A | 6/1934 | Johnson | 285/93 |
| 4,343,333 A * | 8/1982 | Keister | 138/125 |
| 4,403,631 A * | 9/1983 | Abdullaev et al. | 138/130 |
| 4,431,034 A * | 2/1984 | Abdullaev et al. | 138/130 |
| 4,514,103 A | 4/1985 | Wise et al. | 138/106 |
| 4,649,963 A | 3/1987 | Raghavan et al. | 138/130 |
| 4,693,281 A | 9/1987 | Creedon | 138/174 |
| 4,850,395 A * | 7/1989 | Briggs | 138/30 |
| 4,867,205 A * | 9/1989 | Bournazel et al. | 138/130 |
| 5,024,252 A | 6/1991 | Ochsner | 138/130 |
| 5,269,349 A * | 12/1993 | Sugier et al. | 138/172 |
| 5,645,109 A * | 7/1997 | Herrero et al. | 138/134 |
| 5,813,439 A * | 9/1998 | Herrero et al. | 138/134 |
| 5,934,335 A | 8/1999 | Hardy | 138/131 |
| 6,006,788 A * | 12/1999 | Jung et al. | 138/131 |
| 6,053,213 A * | 4/2000 | Jung et al. | 138/130 |
| 6,065,501 A * | 5/2000 | Feret et al. | 138/134 |
| 6,085,798 A | 7/2000 | Le Nouveau | 138/125 |
| 6,085,799 A | 7/2000 | Kodaissi et al. | 138/135 |
| 6,110,550 A * | 8/2000 | Jarrin et al. | 428/36.91 |
| 6,123,114 A * | 9/2000 | Seguin et al. | 138/124 |
| 7,124,780 B2 * | 10/2006 | Dupoiron | 138/134 |

FOREIGN PATENT DOCUMENTS

FR 2828722 2/2003

* cited by examiner

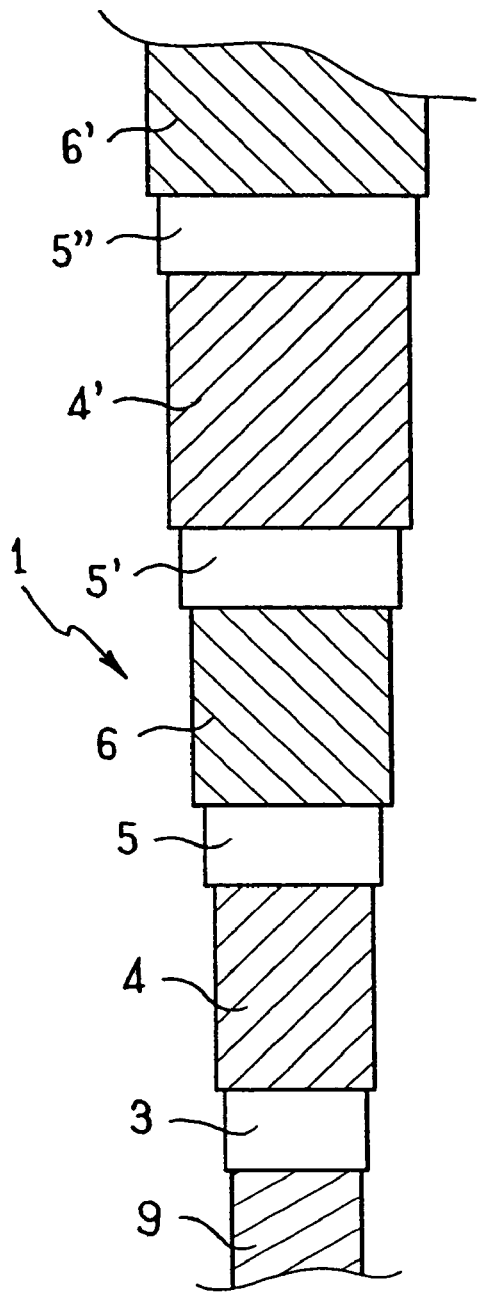
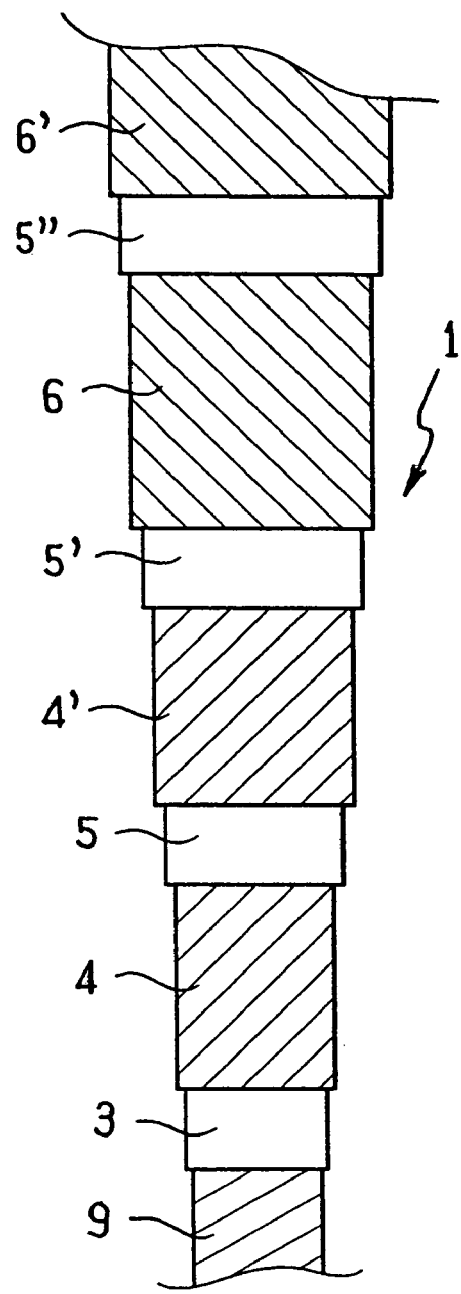
FIG_4  FIG_5

FLEXIBLE NON-BONDED PIPE WHICH IS USED TO PRODUCE A DYNAMIC PRESSURISED FLUID TRANSFER HOSE AND, IN PARTICULAR, A MUD HOSE FOR ROTARY OIL DRILLING

CROSS-REFERENCE TO RELATED APPLICATIONS

The present application is a 35 U.S.C. §§ 371 national phase conversion of PCT/FR2004/001807, filed Jul. 8, 2004, which claims priority of French Application No. 03/08614, filed Jul. 15, 2003. The PCT International Application was published in the French language.

BACKGROUND OF THE INVENTION

The present invention relates to the field of petroleum extraction, particularly drilling, both offshore and onshore, and essentially to a short flexible pipe, known as a "mud hose" or commonly as a "rotary hose" or "kelly hose", which is used for injecting mud during rotary drilling operations. This is a flexible pipe that forms the link between the mud-injection head and the fixed pipe from the mud pumps, as described in the American Petroleum Institute's standards API 7L and API 7K. A hose of this type is illustrated, for example, in U.S. Pat. No. 4,514,103, to which reference may be made.

Mud hoses have to withstand high pressures, for example, a nominal in-service pressure of 350 to 520 bar, and a burst pressure of 860 to 1300 bar. They experience dynamic stresses owing to the changing of the drillpipes and to the ascent and descent of the drillpipes (approximately 15 m over the course of 1 hour). They have to exhibit great bending flexibility in order to withstand the significant variations in radius of curvature. On account of their accessibility, they may easily be replaced, so it is preferable for them to have an inexpensive structure. Lastly, they have to withstand great variations in pressure between the load and load-free phases.

In the past, a solution to these problems has been sought in the form of hoses consisting of short lengths of rigid or slightly flexible pipe connected by articulated joints, as shown in U.S. Pat. No. 1,852,632 and U.S. Pat. No. 1,963,368. Nowadays, the flexible pipes generally used for mud injection are bonded pipes, i.e. pipes having reinforcements embedded in an elastomer matrix. This is, in particular, the case of the pipe shown in document U.S. Pat. No. 4,514,103 cited above.

It became apparent that there was a need to diversify the current offering of mud hoses available and to seek an alternative to current bonded pipes.

An object of the invention is to propose a pipe of the unbonded type that comprises at least one pair of crossed armor plies arranged at substantially 550°, with no pressure vault, i.e. an unbonded flexible-pipe structure of reduced cost as compared to that of conventional structures with a vault. These "balanced" structures, known as "55" by specialists, are known for low-pressure applications and are not suited to withstand the pressures envisaged in the present application and thus to resist the ensuing problem of creep.

In fact, in "55" pipes with no pressure vault, the pressure of fluid transported tends to cause the pressure sheath to flow into the gaps that exist between the inner-ply armor wires. This is particularly critical when the local clearance between wires may be large, as is highlighted in document FR 2 664 019 A of the applicant, which advocates, in particular, interlocking of the inner armor ply in response to the problem posed.

Moreover, a further problem revealed by the applicant and that the invention aims to solve lies in the rotation of unbonded flexible pipes when they are pressurized. This tendency is particularly significant since mud hoses for rotary drilling are of small diameter.

This tendency to rotate is explained, in particular, by the radial swelling of the armor plies during pressurization. This radial movement of the armor plies is particularly great when the flexible pipe includes a set of layers (antiwear strips, reinforcing strips, anticreep strips, adhesive strips) that suffer crushing during pressurization. This is particularly the case of the solution advocated by the present invention in which the proposed structure includes a plurality of layers that, because they are crushed, tend to exacerbate rotation of the pipe about its axis.

SUMMARY OF THE INVENTION

According to the invention, this problem is solved surprisingly and in a manner that runs counter to conventional solutions in the following manner: The invention proposes a flexible unbonded pipe for producing a dynamic pressurized fluid-transfer hose, in particular a mud hose, for rotary oil drilling or turbodrilling. The pipe is of the type that comprises, from the inside to the outside, an inner polymer sheath, at least two crossed armor plies, consisting of wire wound helically at opposing lay angles A and B close to the 55° equilibrium angle, having a mean centered on a value close to the equilibrium-angle value, and an outer polymer sheath, characterized in that it includes an anticreep layer, arranged around the inner sheath, produced by at least one winding with contiguous edges of a strip with high mechanical properties, and in that the lay angles A and B of the crossed armor plies are not equal.

Thus, according to the invention, the unbonded flexible-pipe structure simultaneously solves the problems of creep connected with pressure and the problems of twisting discovered and highlighted by the applicant.

Most known unbonded flexible pipes tend to generate a rotary movement when pressurized. However, the forces engendered are low and are taken up by the fittings at the ends. In the case of mud hoses, this tendency to rotate is detrimental and problematic.

The invention thus remedies these creep and rotation problems by means of the winding of a strip designed to prevent creep between the pressure sheath and the inner armor ply and lay-angle dissymmetry within one and the same pair of plies, the mean of the lay angles remaining close to the 55° equilibrium angle. In other words, the crossed armors are wound at angles A and B that are different from one another. The difference in the angles A and B is advantageously between 4° and 10° and, more particularly, between 6° and 80°.

In this way, the flexible pipe of the invention allows use at a high service pressure without giving rise to problems of creep or twisting by virtue of the particular combination of its structural characteristics.

It is surprising to note that the lay-angle dissymmetry, known, per se, in other circumstances, may have a beneficial effect on the specific problem of twisting that the invention aims to solve. Thus, U.S. Pat. No. 6,085,799 in the name of the assignee hereof discloses a pipe that can be buried and has a carcass, an inner sheath and a armor ply laid generally symmetrically, or, occasionally, asymmetrically in one example. However, the pipe that can be buried is a very long pipe that is completely static because it is buried, whereas the mud hose is a generally short pipe working dynamically. The problems encountered are completely different. For the rest, the reinforcements of the pipe that can be buried are conventional wires and, in particular, wires that can be interlocked for the inner ply, which is interlocked. Furthermore, the asymmetry described is low and corresponds to a asymmetry introduced in order to take account of the difference in radius over which the crossed plies are wound. In a likewise different context, namely that of bonded pipes, U.S. Pat. No. 4,693,281 discloses a tube in which provision is made for successive windings and an increasing lay angle for glass fibers embedded in an epoxy resin. The lay angle is different in order to allow identical detensioning of the plies, but obviously has no influence over the twisting of the tube, which is blocked by the matrix. Lastly, according to U.S. Pat. No. 4,649,963, use is made of an extremely rigid pipe having eight plies of flat steel wire wound differently and with lay angles varying between 39° through 84°. This pipe is designed to withstand high pressures but evidently is unable to be used to produce a mud hose, which has to remain flexible.

Advantageously, provision is made for one flexible adjacent layer into which at least one wound reinforcing wire is able to penetrate at least partially. The flexible layer is advantageously made from a natural or synthetic elastomer material, such as rubber. It may be placed above or below the reinforcing wire winding with which it is associated, but preferably the flexible layer of the inner ply is placed under the wire winding that is able to penetrate, and the flexible layer of the outer ply is placed over the wire winding that is able to penetrate.

Advantageously, the wound armor wire that is able to penetrate at least partially into the flexible layer consists of a round wire or a strand. On the one hand, the use of a round wire or of a strand allows good control of clearances and the flexible layer allows correct placement of the wire and the distribution of clearances by virtue of the impressions that the wire forms therein. On the other hand, any detrimental effect generated by a round wire or a strand, namely that of promoting torsion of the pressurized pipe, is counteracted by the lay angle asymmetry.

The anticreep layer is advantageously produced by one or more windings of an elongate element with high mechanical properties (essentially tensile strength), with a short pitch and an angle advantageously greater than 60°. The winding angle is, in particular, a function of the width of the strip-type elongate element used to produce the anticreep layer. It may, in particular, be a winding of aramid fibers (particularly of the Kevlar® type) at an angle of 70° over the sheath, and preferably under the armor plies and, in particular, below the lower armor ply, above the inner sheath.

In a particular embodiment of the present invention, the pipe includes only two crossed armor plies. Particularly advantageously, the lower ply is reinforced at an angle greater than that of the outer ply.

In a further embodiment, the pipe includes a first pair of armor plies of opposite lay angles A and B and at least one other ply or another pair of alternate or imbricated crossed armor plies. Advantageously, the lay angles of the other ply or of the other pair are chosen substantially equal to the lay angles A and B of the first pair of armor plies, following the winding direction of said plies. No lay angle other than the angles A and B is introduced. It should be noted that there are stable four-ply hoses, as is disclosed in U.S. Pat. No. 5,024,252, which are used as a hybrid riser for use at great depth or as a hybrid transportation pipe for great depth, which exhibit lay-angle asymmetry. However, this asymmetry exists between the successive pairs of crossed plies and not within one and the same single ply pair, as in the present invention.

The invention naturally also relates to a mud hose consisting of a pipe in accordance with the invention.

BRIEF DESCRIPTION OF THE DRAWINGS

The invention will be better understood and further advantages and features will become apparent upon reading the following description. Reference will be made to the appended drawings, in which:

FIGS. 4 and 5 are two diagrammatic plan views with partial cut-away, showing a flexible pipe produced with two pairs of, respectively, alternate and imbricated crossed armors.

DESCRIPTION OF A PREFERRED EMBODIMENT

Figure 1:
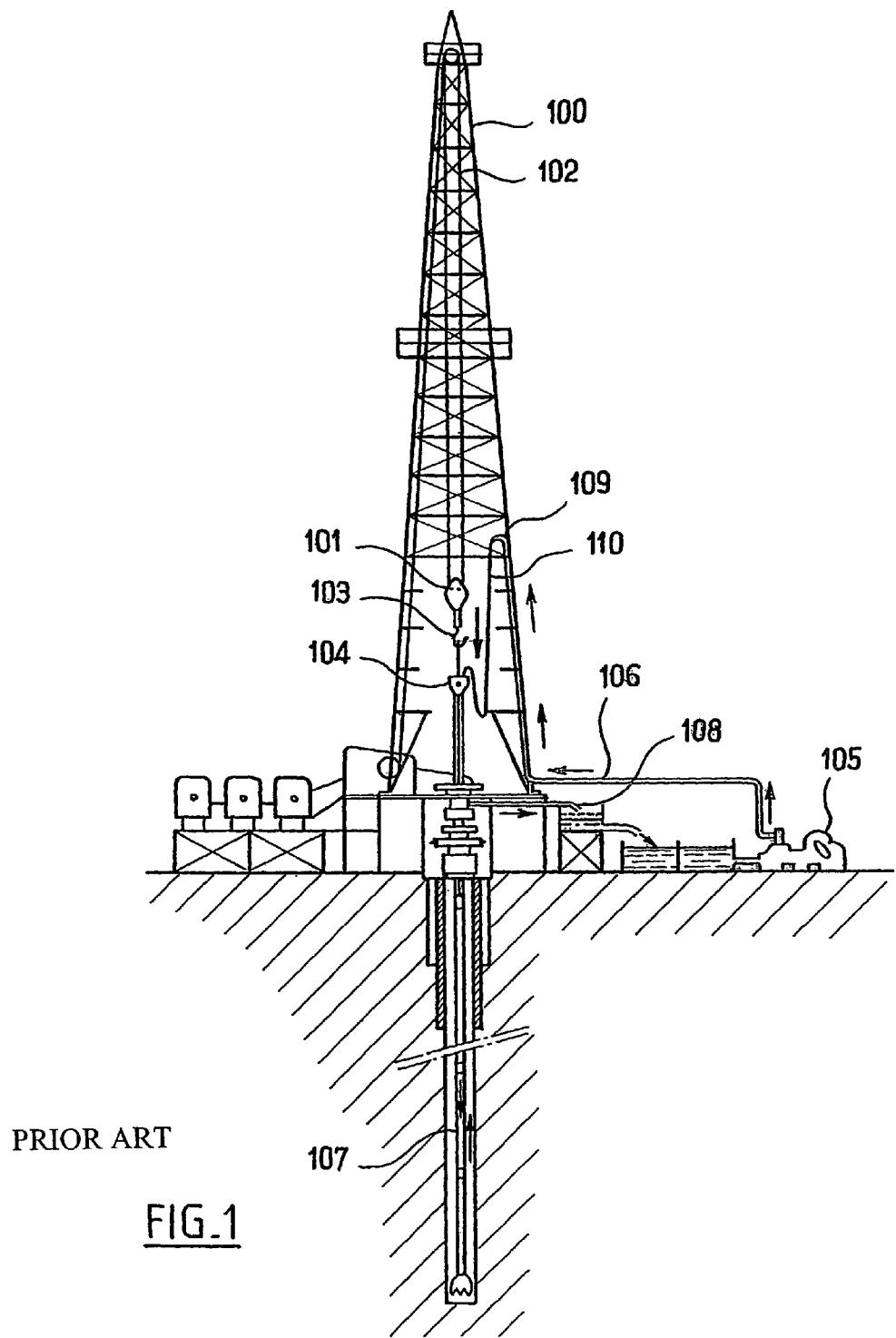
FIG. 1 is an elevational view of a rotary drilling well using a mud hose.

FIG. 1 shows a typical rotary drilling installation comprising a derrick 100, a movable block 101 suspended from a cable 102 and supporting a lifting hook 103 to which is attached the mud-injection head 104 that is supplied with mud by mud pipes 105 conveying the mud in a mud-pumping pipe 106 connected to the head 104 by the mud hose 110. The injection head 104 sends the mud into the drillpipe 107, and the mud that rises from the well returns via the channel 108 toward the pumps. The hose 110 therefore connects the fixed point, consisting of the end 109 of the pumping pipe 106 and the movable point, consisting of the head 104 that is displaced over the height of the derrick when the length of the drill string is modified. The hose 110 must thus withstand the mud-injection pressures and make it possible to accommodate the above-mentioned movements that impose a high degree of curvature at certain points of its travel and, above all, significant variations owing to the vertical movement.

Figure 2:
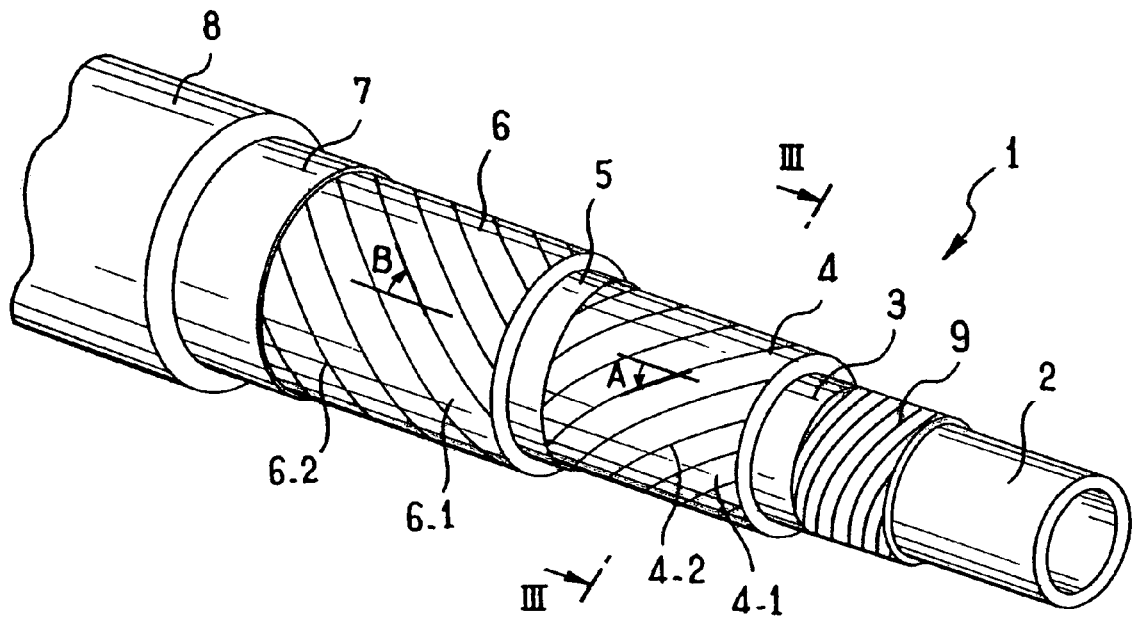
FIG. 2 is a perspective, cut-away view of one embodiment of an injection hose in accordance with the invention.
Figure 3:
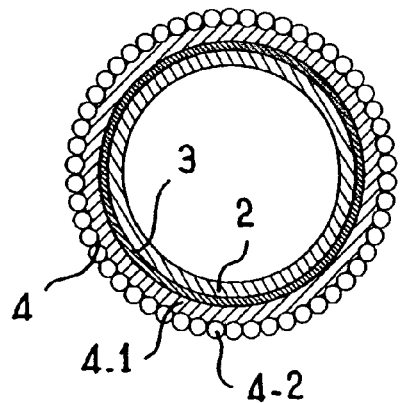
FIG. 3 is a sectional view on III-III of FIG. 2 through the first armor ply of the hose of FIG. 2.

FIG. 2 shows the general structure of an unbonded flexible pipe 1 that is suitable according to the invention for the production of the mud hose 110.

The pipe 1 includes, from the inside toward the outside, an inner polymer sheath 2, one or more thin intermediate antiwear layers 3 produced in a known manner, particularly by means of helical windings of strip made from lubricating plastics or by means of a sheath made from the same material, a first armor ply 4 produced by means of a helical winding of round wire, strand or cable, for example at a first angle A formed with the axis of the pipe 1, one or more antiwear layers 5, a second armor ply 6 produced by means of a helical winding of round wire at a second angle B, different from A, formed with the axis of the pipe 1 and of opposite sign from the angle A, one or more layers of adhesive strip 7, and an outer polymer sheath 8. It is also possible to have a winding (not shown), between the outer reinforcement 6 and the outer sheath 8, of a rectangular flat wire that is wound at an angle of, for example, 70° and is used to prevent the pipe being crushed upon kinking. This winding is not contiguous and is generally formed from a single wire that is wound with clearance (the successive turns may be separated by two to three wire widths, for example). The winding direction is advantageously crosswise relative to the outer reinforcement that it covers (but this is not mandatory).

Furthermore, provision is made over the inner sheath 2 for windings of reinforcing strip with a short pitch, designed to prevent creep of the pressure sheath. These contiguous windings may be produced in the form of strips woven from very strong fibers, particularly from aramid fibers such as Kevlar®: One or more layers 9 produced, for example, by a winding of Kevlar® strips at approximately 70° relative to the axial direction. The winding angle depends, in particular, on the diameter of the pipe and on the width of the strip. The number of layers depends on the material used and on the service conditions. It may be advantageous to use a strip of the type described in patent application FR 2 828 722 of the assignee hereof, in which the strip has thin lateral edges designed to at least partially overlap between the successive turns. "Winding with contiguous edges" will also be understood to mean winding with partial overlapping of the thin edges described in that application.

The armor ply 4 consists of a resilient wire-placement layer 4-1, for example made from rubber, over which the round steel wires 4-2 of angle A are wound, these being able to penetrate slightly into the resilient layer 4-1. The second ply 6 consists, in a similar manner, of an overlayer 6-1 and of a winding of round wire 6-2 of angle B, the winding direction being the opposite of that of the winding of wire 4-2 of the associated ply, according to the known principle of crossed plies. More generally, the armor ply wires 4-2, 6-2 are non-interlocked elongate elements (rounds, strands). The flexible layers are located below the inner ply but above the outer ply. They allow the reinforcements to be positioned and limit the displacement of the reinforcing wires when the pipe experiences dynamic in-service stresses, thereby preventing localized combining of clearances within one and the same ply.

According to the invention, the angle A and the angle B, measured relative to the longitudinal axis, are not equal and are both close to the equilibrium angle, for example between 49° through 62°, the mean being at an equilibrium angle value of approximately 55°, i.e. between 54° through 57°. The angle A of the lower ply is preferably greater (in absolute value) than the angle B of the upper ply. For example, the angle A may be +59° and the angle B −52°. The difference between the lay values A and B is advantageously greater than 4° and less than 10°.

It is possible to make provision for a plurality of pairs of imbricated or alternate crossed armor plies. According to the invention, the lay angles of the one or of the other plies will also be chosen equal to the angles A and B of the first ply: FIG. 4 shows a simplified diagram illustrating alternate ply layers 4, 6 then 4', 6' of angles A, B, A, B, with the interposition of intermediate layers 5, 5' , 5"; and in FIG. 5, a simplified diagram illustrating imbricated ply layers 4, 4' , 6, 6' of angles A, A, B, B, again with the interposition of intermediate layers 5, 5', 5", particularly antiwear layers. It would also be possible to have an odd number of plies, for example three plies arranged at angles of +59°,−52° and +59°, i.e. again with only two different angles, the plies with identical angles having the same winding direction.

It should be pointed out that mention of a different lay angle for the armor plies according to the invention involves genuine asymmetry that is greater than the simple geometrical asymmetry introduced in order to take account of the difference in winding radius that exists for the winding of each ply. Thus, in a configuration with more than two plies the inner ply is of angle A wound with a radius $R_A$ and the second, opposite ply of angle B, with B different from A, wound with a radius $R_B$, the third ply having the same angle as the ply whose winding direction it mimics, except for the slight geometrical asymmetry, which is generally 1° to 1.5°, introduced in order to take account of the geometrical difference in radius. This geometrical asymmetry is expressed in a simplified way by the formula $R1/R2=\tan A1/\tan A2$, linking the lay angles A1 and A2 to the radii R1 and R2 of winding of two layers.

The invention claimed is:

1. A flexible unbonded pipe for a dynamic pressurized fluid-transfer hose comprising from the inside to the outside,
   an inner polymer sheath,
   at least two crossed armor plies, each comprised of at least one wound reinforcing wire comprising a wire or strand, and at least one flexible adjacent layer into which at least one wound reinforcing wire is able to penetrate at least partially, and the at least two plies being wound helically at opposing lay angles A and B, the lay angles A and B are not equal, each lay angle being close to a 55° equilibrium angle, the lay angles having a mean centered on a value close to the equilibrium angle value, and
   an outer polymer sheath;
   the pipe further including an anticreep layer arranged around the inner sheath and comprised of at least one winding with contiguous edges, the winding being of a strip with high mechanical properties.

2. The pipe as claimed in claim 1, wherein the difference in the angles A and B is between 4° and 10°.

3. The pipe as claimed in claim 1, wherein the flexible layer is made from a natural or synthetic elastomer material.

4. The pipe as claimed in claim 1, wherein the flexible layer of the inner ply is placed under the wire winding that is able to penetrate, and the flexible layer of the outer ply is placed over the wire winding that is able to penetrate.

5. The pipe as claimed in claim 1, wherein the anticreep layer comprises one or more windings of an elongate element with high mechanical properties, at a short pitch and an angle of at approximately 70°.

6. The pipe as claimed in claim 5, wherein the windings of the anticreep layer are provided under the armor ply.

7. The pipe as claimed in claim 5, wherein the windings of the anticreep layer are comprised of aramid fiber.

8. The pipe as claimed in claim 1, including only two of the crossed armor plies.

9. The pipe as claimed in claim 8, wherein the lay angle A of a lower one of the plies is greater than the lay angle B of an upper one of the plies.

10. The pipe as claimed in claim 1, including a first pair of the armor plies at the lay angles A and B, and at least one other ply.

11. The pipe as claimed in claim 10, wherein the lay angle of one of the at least one other armor ply is substantially equal to one of the lay angles A or B of the first pair of armor plies.

12. A mud hose for rotary drilling, comprising a pipe as claimed in claim 1.

13. The pipe as claimed in claim 1, wherein the difference in the angles A and B is between 6° and 8°.

14. The pipe as claimed in claim 1, including a first pair of the armor plies at the lay angles A and B, and another pair of alternate or imbricated crossed armor plies.

15. The pipe as claimed in claim 14, wherein the lay angles of the another pair of alternate or imbricated crossed armor plies are substantially equal to the lay angles A and B of the first pair of armor plies.

16. A flexible unbonded pipe for a dynamic pressurized fluid-transfer hose comprising from the inside to the outside,
   an inner polymer sheath,
   at least two crossed armor plies, each comprised of wire, and the at least two plies being wound helically at opposing lay angles A and B, the lay angles A and B are not equal, each lay angle being close to a 55° equilibrium angle, the lay angles having a mean centered on a value close to the equilibrium angle value, and
an outer polymer sheath;
the pipe further including an anticreep layer arranged around the inner sheath and comprised of at least one winding with contiguous edges, the winding being of a strip with high mechanical properties and said strip being woven of very strong fibers.

* * * * *